3,695,936
MANUFACTURE OF GAS ELECTRODES
FOR FUEL CELLS
Robert Chevet, Chilly-Mazarin, and Jacques Goualard, Fresnes, France, assignors to Compagnie Generale de Electricite, Paris, France
No Drawing. Filed Nov. 23, 1970, Ser. No. 92,239
Claims priority, application France, Nov. 21, 1969, 6940156
Int. Cl. H01m 13/04
U.S. Cl. 136—122         10 Claims

ABSTRACT OF THE DISCLOSURE

A process for the manufacture of a gas combustion-assisting electrode for fuel cells, said electrode comprising a porous active conductive layer catalytically deposited upon a conductive support through which a liquid can be passed, said porous layer containing a water-repellent agent, which process comprises,
preparing a liquid suspension comprising a powder of the material intended to constitute the active layer, said water-repellent agent and a fibrous compound capable of being carbonized,
depositing said suspension onto said conductive support,
drying said suspension by applying a vacuum to said support and by heating,
compressing the resulting assembly under a pressure of about 10 kg./cm.$^2$, and
consolidating the resulting electrode by heating, whereby said fibrous compound is carbonized.

---

The invention concerns the manufacture of gas electrodes and more particularly of combustion-assisting electrodes, for fuel cells, of the type comprising a porous active conductive layer catalytically deposited upon a conductive support through which a liquid can be passed, the active layer containing in addition a water-repellent agent also serving as a binder for the particles of the material intended to constitute the active layer.

In French Patent 1,591,308, filed on Nov. 6, 1968, by the present inventors and entitled "Gas Electrode for Fuel Cells and Process for Its Manufacture," there is described an electrode of the aforesaid type in which the conductive porous layer consists of carbon particles onto which a catalyst has been deposited.

The water-repellent agent employed was polytetrafluoroethylene or PTFE.

In the aforesaid patent, the following procedure is adopted for the production of such an electrode:

The catalyst-coated carbon particles are brought into suspension in an appropriate liquid medium into which a PTFE emulsion is introduced. After homogenization, the whole is deposited on the conductive support of the electrode by means of a pneumatic spray gun. This deposition takes place in such manner as to form a number of underlayers, the deposited material being dried after the formation of each of the underlayers. The support thus coated and optionally provided with a porous layer of a water-repellent material is subjected to a thermal treatment which results, notably, in the sintering of the PTFE.

However, the present inventors have found that in some cases cracks are produced in the porous layer containing the catalyst during the drying of the underlayers, with the result that defects are introduced which are likely to have a serious disturbing effect on the operation of the electrode. In addition, the process employed for the production of the electrode by spraying by means of an automatic spray gun involves a fairly lengthy operation and also results in a considerable loss of material.

The present invention has for its object to obviate the aforesaid disadvantages, and it concerns a process for the production of a gas electrode, more particularly of a combustion-assisting electrode, for fuel cells, of the type comprising a porous active conductive layer catalytically deposited upon a conductive support through which a liquid can be passed, the porous layer comprising in addition a water-repellent agent, the process comprising preparing, in an appropriate liquid a suspension comprising a powder of the material intended to form the active layer, the water-repellent agent, preferably a wetting agent, and a fibrous compound capable of being carbonized, depositing this suspension upon the conductive support and drying by the application of a vacuum below the support and heating, whereafter the whole is compressed under a pressure of about 10 kg./cm.$^2$, and finally, a thermal treatment is applied to consolidate the electrode, in the course of which the fibrous compound is carbonized.

In accordance with the present invention, the fibrous compound is preferably chosen from compounds of cellulosic origin, or those having a polyamide base.

The fibrous compound may be, for example, paper pulp, or cellulose fibers, or polyamide fibers. The fibrous compound is present to, on the one hand, avoid cracking during the drying of the active layer by preventing the movement of material during the drying step, and on the other hand, to increase the pore volume within the electrode during the carbonization.

Electrodes comprising a layer formed of particles of a catalyst, a water-repellent binder comprising a fluorocarbon resin and a water-absorbing material, optionally in hydrous form, and intended to improve the irrigation of the electrode by the electrolyte, are already known from U.S. Pat. No. 3,386,859, issued June 4, 1968.

However, it is clearly indicated in said patent that the water-absorbing material must not be decomposed during the manufacture of the electrode.

Consequently, when this material is nylon, it is contrary to the teaching of the patent for the nylon to be carbonized.

Moreover, it is known from French Patent No. 1,542,-346, filed Nov. 7, 1967, to produce a conductive layer for the gaseous fuel cell electrode by the pyrolysis of a fibrous material, but it is to be noted that this material is introduced in the form of a sheet and not in the form of a suspension.

The material intended to constitute the active conductive layer in the present invention may be the same as that described in the aforesaid French patent, namely carbon particles onto which has been deposited a catalyst chosen from the group formed of metals and metallic oxides. However, particles of activated carbon may also be employed.

Advantageously, the water-repellent agent employed is polytetrafluoroethylene or PTFE, the consolidating treatment then consisting in heating at about 300° C. under a hydrogenated nitrogen atmosphere. The PTFE may be employed in the form of solid granules of small dimensions, for example of the order of 35 microns, but it is also possible to employ it in the form of an emulsion, for example in an ammoniacal solution.

In accordance with one feature of the invention, in this case, a compound capable of producing the gelatinization of the PTFE emulsion, for example acetone, is advantageously added to the suspension containing the particles of the material intended to constitute the active layer, the PTFE, the wetting agent and the fibrous compound, before this suspension is deposited upon the support.

Further features of the invention will become apparent from the following description of an example of the application of the process according to the invention.

A suspension is first prepared in an aqueous paper pulp medium. In addition, there is prepared a suspension comprising polytetrafluoroethylene and a wetting agent. The wetting agent may be alkylphenoxypolyethoxyethanol. In order to form this second suspension, the PTFE may be employed either in the dry state in the form of granules, or in the form of an emulsion. Thus, 40 grams of PTFE in the solid state, in the form of granules whose diameter is about 35 microns, may be dispersed in a solution containing 75 grams per liter of alkylphenoxypolyethoxyethanol. To the suspension thus prepared is added the first suspension, which comprises, for example, 10 grams of paper pulp. These two suspensions are mixed and to the resulting mixture are added the particles of the material intended to constitute the active conductive layer. Thus, 50 grams of acetylene black containing 8% of silver may be added.

In this case, a PTFE emulsion is employed, the dimensions of the PTFE grains then being on the order of 0.3 micron. After the introduction of the particles of the material intended to constitute the active conductive layer, acetone is advantageously added so as to break the PTFE emulsion and to produce the gelatinization of this emulsion.

For forming the electrode, the mixture obtained is deposited upon the conductive support. The latter may consist of a thin plate of sintered nickel produced, for example, by electrostatic spraying followed by rolling and sintering. This conductive support may also consist of a graphite gauze or a fairly strong paper.

The fluid entering into the constitution of this mixture is thereafter eliminated by application of a vacuum below the said support.

By way of illustration, the quantity of product deposited may be such that the weight of the product after this operation is about 15 milligrams per cm.$^2$. Drying is thereafter effected in an oven at about 100° C. for about fifteen minutes, and the electrode thus produced is then compressed under a pressure of about 10 kg./cm.$^2$.

Finally, there is applied a consolidating treatment which, in the case where the water-repellent agent consists of polytetrafluoroethylene may comprise a heating at about 380° C. for about thirty minutes under a nitrogen atmosphere containing 10% of hydrogen. This operation also produces the carbonization of the fibrous compound introduced into the electrode during its preparation, and thus increases the pore volume within the said electrode.

Of course, the invention also includes an electrode produced by the above-described process, as well as a fuel cell comprising at least one electrode produced by this process.

By way of non-limiting illustration, an electrode produced in accordance with the invention gave, in instantaneous electrochmeical tests, a current density of 50 milliamperes per cm.$^2$ for a voltage of 200 millivolts, as compared with the reference Hg/Hgo electrode, and in lengthy tests, at 40 milliamperes per cm.$^2$, the voltage drop is 30 millivolts in three thousand hours.

Of course, the invention is in no way limited to the embodiment described, which has been referred to only by way of example. More particularly, it is possible without departing from the scope of the invention to make modifications in details, to change certain arrangements or to replace certain means by equivalent means.

What is claimed is:

1. A process for the manufacture of a gas combustion-assisting electrode for fuel cells, said electrode comprising a porous active conductive layer catalytically deposited upon a conductive support through which a liquid can be passed, said porous layer containing a water-repellent agent, which process comprises, preparing a liquid suspension comprising a powder of the material intended to constitute the active layer, said water-repellent agent and a fibrous compound capable of being carbonized, depositing said suspension onto said conductive support, drying said suspension by applying a vacuum to said support and by heating, compressing the resulting assembly under a pressure of about 10 kg./cm.$^2$, and consolidating the resulting electrode by heating, whereby said fibrous compound is carbonized.

2. The process according to claim 1 wherein said suspension further comprises a wetting agent and is prepared by mixing a first suspension, in aqueous medium, of said fibrous compound and a second suspension of said water-repellent agent containing said wetting agent, and then adding said powder to the resulting mixture.

3. The process according to claim 2 wherein said water-repellent agent is polytetrafluoroethylene and wherein said consolidating comprises heating said resulting electrode at a temperature of about 380° C. in a hydrogen-containing nitrogen atmosphere.

4. The process according to claim 3 wherein said second suspension comprises a polytetrafluoroethylene emulsion of 60% by weight polytetrafluoroethylene in an ammoniacal solution, said wetting agent being alkylphenoxypolyethoxyethanol.

5. A process according to claim 4 wherein a compound which is capable of gelatinizing the polytetrafluoroethylene is added to said suspension prior to depositing said suspension onto said support.

6. The process according to claim 1 wherein said material consists of carbon particles, the carbon having been activated or at least partially coated by a catalyst.

7. The process according to claim 1 wherein said fibrous compound is a compound of cellulosic origin or a polyamide-based compound.

8. The process according to claim 1 wherein in said resulting assembly, the coating comprises, by weight, 10% of said fibrous compound, 40% of said water-repellent agent and 50% of said material intended to constitute the active layer.

9. The process according to claim 1 wherein said-repellent agent is polytetrafluoroethylene.

10. The process of claim 9 wherein said material intended to constitute the active layer consists of carbon particles, the carbon having been activated or at least partially coated by a catalyst, and wherein said fibrous compound is a compound of cellulosic origin or a polyamide-based compound.

References Cited

UNITED STATES PATENTS

| | | | |
|---|---|---|---|
| 2,860,175 | 11/1958 | Justi | 136—120 FC |
| 3,287,169 | 11/1966 | Rogers | 136—120 FC |
| 3,413,152 | 11/1968 | Folkins et al. | 136—86 D |
| 3,501,350 | 3/1970 | Horowitz | 136—122 X |

FOREIGN PATENTS

| | | | |
|---|---|---|---|
| 1,158,580 | 7/1969 | Great Britain | 136—120 FC |

WINSTON A. DOUGLAS, Primary Examiner

M. J. ANDREWS, Assistant Examiner